United States Patent [19]
Okazawa et al.

[11] Patent Number: 6,131,169
[45] Date of Patent: Oct. 10, 2000

[54] RELIABILITY OF CROSSBAR SWITCHES IN AN INFORMATION PROCESSING SYSTEM

[75] Inventors: Koichi Okazawa, Ebina; Toshiaki Tarui, Sagamihara; Yasuyuki Okada, Yamato, all of Japan

[73] Assignee: Hitachi, Ltd., Tokyo, Japan

[21] Appl. No.: 09/460,513

[22] Filed: Dec. 14, 1999

Related U.S. Application Data

[63] Continuation of application No. 08/962,683, Nov. 3, 1997, Pat. No. 6,035,414.

[30] Foreign Application Priority Data

Nov. 8, 1996 [JP] Japan ................................. 8-313123

[51] Int. Cl.[7] .................................................. G06F 11/20
[52] U.S. Cl. .............................. 714/7; 710/132; 370/217
[58] Field of Search ................................... 714/3, 4, 6, 7, 714/8; 710/131, 132; 370/217, 219, 220, 228

[56] References Cited

U.S. PATENT DOCUMENTS

| | | |
|---|---|---|
| 5,361,249 | 11/1994 | Monastra et al. . |
| 5,365,511 | 11/1994 | Kusano . |
| 5,453,990 | 9/1995 | Aoki et al. . |
| 5,459,718 | 10/1995 | Kusano . |
| 5,572,679 | 11/1996 | Ishizaka et al. . |
| 5,654,695 | 8/1997 | Olnowich et al. . |
| 5,657,281 | 8/1997 | Rao . |
| 5,751,934 | 5/1998 | Han et al. . |
| 5,781,717 | 7/1998 | Wu et al. . |
| 5,898,826 | 4/1999 | Pierce et al. . |

FOREIGN PATENT DOCUMENTS 6-51910  2/1994  Japan .

OTHER PUBLICATIONS

"The Advanced System Architecture", *Sun World Magazine*, Jan. 1996, pp. 29–32.

*Primary Examiner*—Robert W. Beausoliel, Jr.
*Assistant Examiner*—Christopher Revak
*Attorney, Agent, or Firm*—Antonelli, Terry, Stout & Kraus, LLP

[57] ABSTRACT

An information processing apparatus includes a crossbar switch having a plurality of switching circuits for data transfer; connection lines having address data transfer paths of m-bit unit connected to each of the input/output ports of the switching circuits, control signal transfer paths of m-bit unit connected to each of the input/output ports of the control circuits and back-up transfer paths of m-bit unit connected to each of the input/output ports of the back-up circuits; and transfer path processing circuit connected correspondingly to the connection lines constructed by the n-bit provided on each of the processing units, monitored transfer of data and control signal between the processing units through the switching circuit and the control circuit in the crossbar switch, and detected a failure of at least the switching circuit and the control circuit to thereby change the connection of at least one of the failed switching circuit and control circuit to a connection of the back-up circuit.

4 Claims, 13 Drawing Sheets

RELIABILITY OF CROSSBAR SWITCHES IN AN INFORMATION PROCESSING SYSTEM

This is a continuation of application Ser. No. 08/962,683, filed Nov. 3, 1997, now U.S. Pat. No. 6,035,414.

BACKGROUND OF THE INVENTION

The invention relates to an information processing apparatus and, more particularly, to a data transfer system in various computers such as personal computer, workstation, server apparatus, office computer, minicomputer, main frame, super computer, and the like. Especially, the invention relates to an information processing apparatus by a crossbar switch in a multiprocessor apparatus.

In recent years, a multiprocessor construction has been widespread in an upper apparatus such as personal computer or workstation, a server apparatus, and the like. It is an important subject to improve the performance of a data transfer system for connecting among a plurality of CPUs (Central Processing Units), main storages, and I/O (Input/Output) devices.

As one of constructions of the data transfer systems, there is a construction by a crossbar switch connection. For example, this construction is disclosed in "The Advanced System Architecture", Sun World magazine, Vol. January, pp 29–32, 1996.

Generally, in the construction by the crossbar switch, even if any one of the modules which are connected to the crossbar switch fails, the other portions of the system can continue the operation. However, when at least a part of the crossbar switch itself fails, the whole system becomes down. Therefore, in order to improve the reliability of the whole system, it is necessary to duplicate the crossbar switch.

In many cases, the data transfer system has a construction by a bus connection. In this case, although the bus itself is hard to fail because it doesn't need any device such as an LSI (Large-Scale Integrated Circuit) or the like, there is a possibility such that the whole system is shut down when each module connected to the bus fails. Therefore, the bus is duplicated in order to improve the reliability of the system and such a method has been disclosed in, for example, JP-A-6-51910.

SUMMARY OF THE INVENTION

In a construction using a crossbar switch, it is an object of the invention to provide an information processing apparatus in which the reliability of a system is improved to a one point failure tolerate level that is equivalent to the duplication of the entire crossbar switch or the duplication of the bus, namely, to a level at which the system can endure a failure of an arbitrary LSI while suppressing an increase in costs to a small value.

To accomplish the above object, according to the invention, in an information processing apparatus comprising a plurality of apparatus units such as CPU, memory, I/O device, and the like, there is provided a data transfer system for transferring data among the apparatus units through a crossbar switch which has a plurality of input/output ports connected to the apparatus units and is constructed by a plurality of LSIs, wherein each of the I/O ports of the crossbar switch is constructed so as to have an address data transfer path of one n-bit width or more, each of the address data transfer paths each having the n-bit width is divided into slices of an m-bit unit, the slices are individually connected to the plurality of LSIs, the address data transfer path is constructed by being added with a redundant slice, and the plurality of LSIs are constructed so as to include an LSI to which the redundant slice can be connected.

Each of the I/O ports of the crossbar switch includes a signal transfer path for controlling other than the address data transfer path and an LSI to which the signal transfer path for controlling is connected is provided, thereby duplicating the LSI.

The system has means for, when a fault occurs in an arbitrary one of the plurality of LSIs, switching the connection between each slice connected to the fault LSI and the apparatus units to a non-connection and for reconstructing the address data transfer path by using the slices connected to the non-fault LSIs and the redundant slice without using the fault LSI, the operation as a crossbar switch is continued or restarted, and parts exchange of the fault LSI can be performed.

As means for reconstructing the address data transfer path, the apparatus units connected to the I/O ports of the crossbar switch have a selecting circuit for selecting the transfer path in which each of the slices is set to a unit on the basis of fault information about the LSI.

At the time of the parts exchange, a reducing operation to narrow a width of address data transfer path is executed.

When a fault occurs in any one of the LSIs, the selecting circuit stops the selection of the slice transfer path connected to the fault LSI, selects the slice transfer path adjacent to the slice transfer path whose selection is stopped in place of such a slice transfer path, and sequentially shifting the slice transfer path one by one after that, thereby selecting the slice transfer path.

The selecting circuit has 2-to-1 selectors of the number corresponding to only the number of slice transfer paths and the slice transfer paths are sequentially connected to outputs of the 2-to-1 selectors.

A first output of the apparatus units is connected to an input of the first 2-to-1 selector, the first output and a second output of the apparatus units are connected to an input of the second 2-to-1 selector, the second output and a third output of the apparatus units are connected to an input of the third 2-to-1 selector, and a last output of the apparatus units is likewise connected to an input of the last 2-to-1 selector, respectively. When there is no fault, the last 2-to-1 selector doesn't supply any output to the slice transfer paths and the other 2-to-1 selectors selects the output of the former number from the apparatus unit and supplies the selected output to the slice transfer path.

When there is a fault, the 2-to-1 selector to which the slice transfer path connected to the fault LSI is connected doesn't generate any output and the 2-to-1 selector connected to the slice transfer path subsequent to the slice transfer path connected to the fault LSI selects the output of the latter number from the apparatus unit and supplies the selected output to the slice transfer path.

DESCRIPTION OF THE PREFERRED EMBODIMENTS

Embodiments of the present invention will now be described hereinbelow with reference to the drawings.

Figure 1:
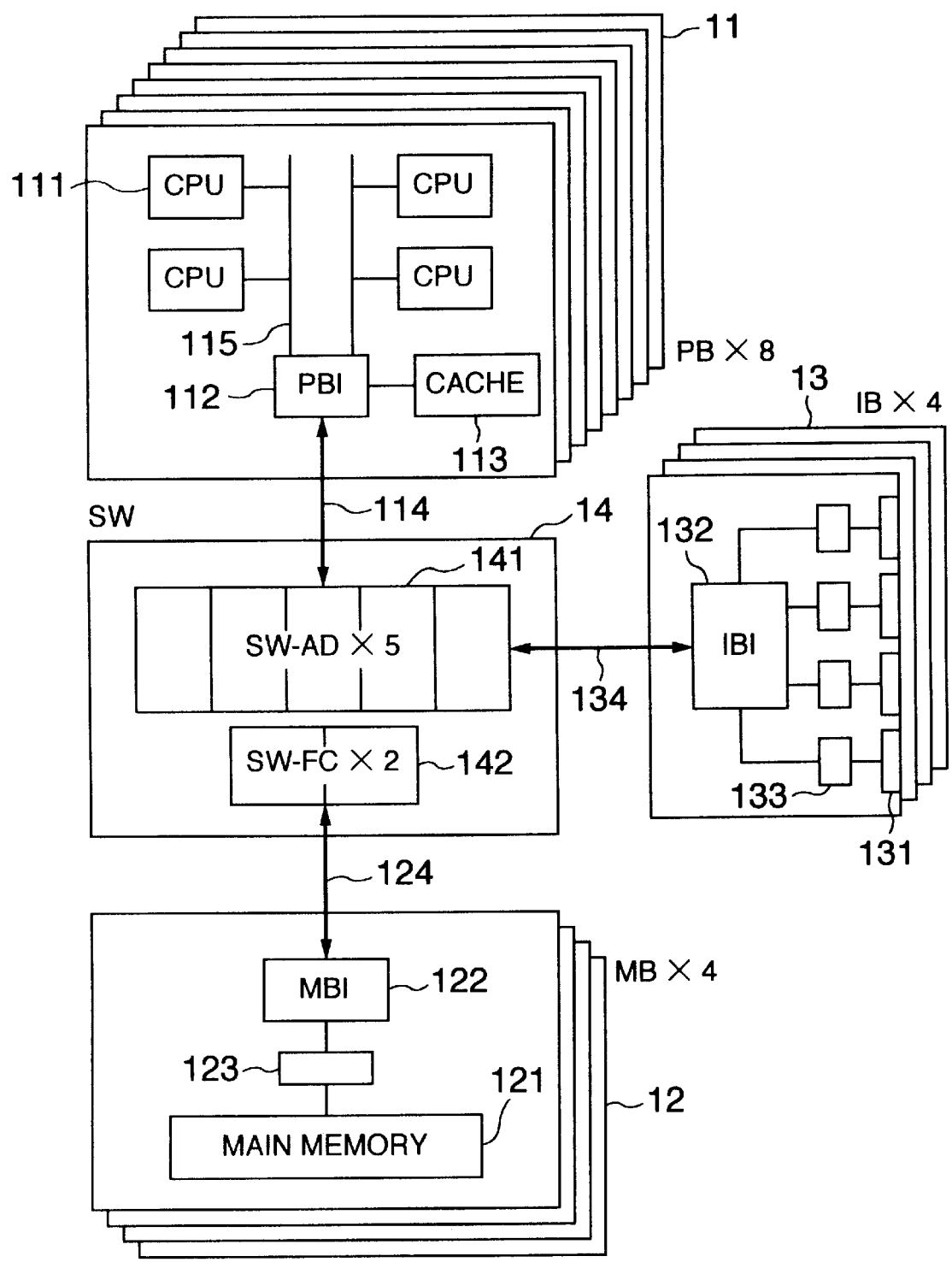
FIG. 1 is a constructional diagram of system hardware of a multiprocessor system to which the invention is applied.
Figure 2:
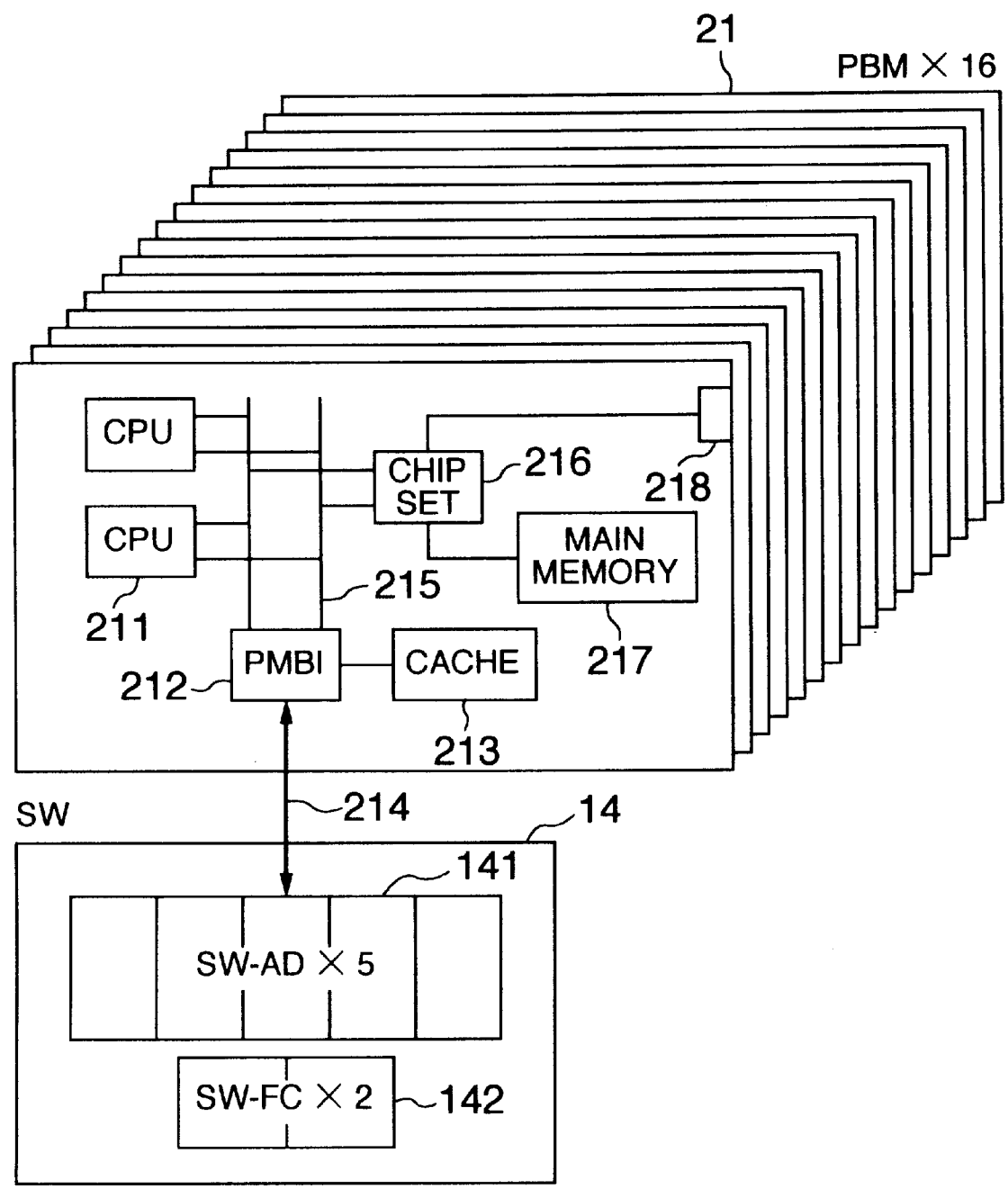
FIG. 2 is a constructional diagram of another system hardware of a multiprocessor system to which the invention is applied.
Figure 3:
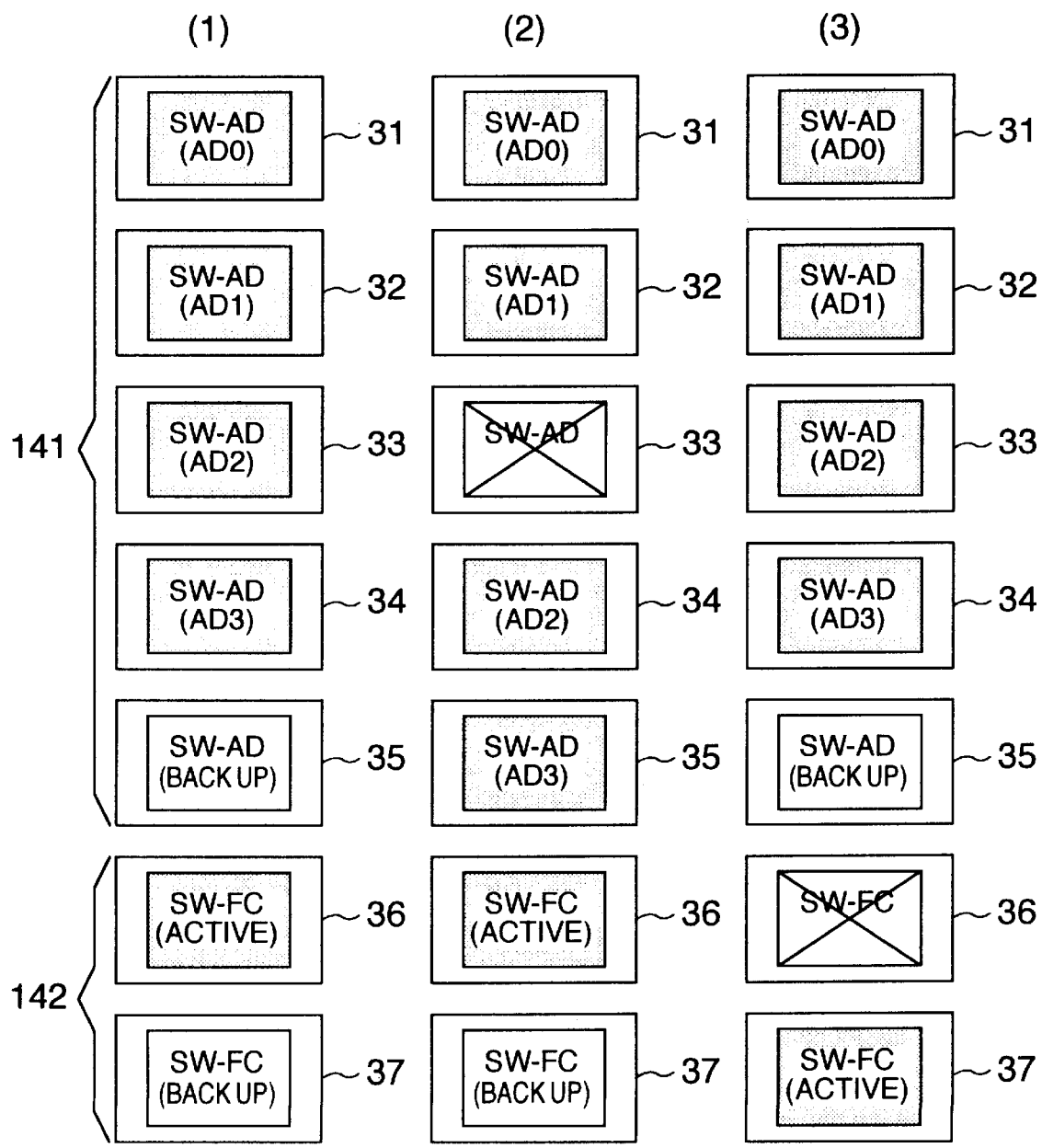
FIG. 3 is a constructional diagram of LSIs of a crossbar switch according to the invention.
Figure 6:
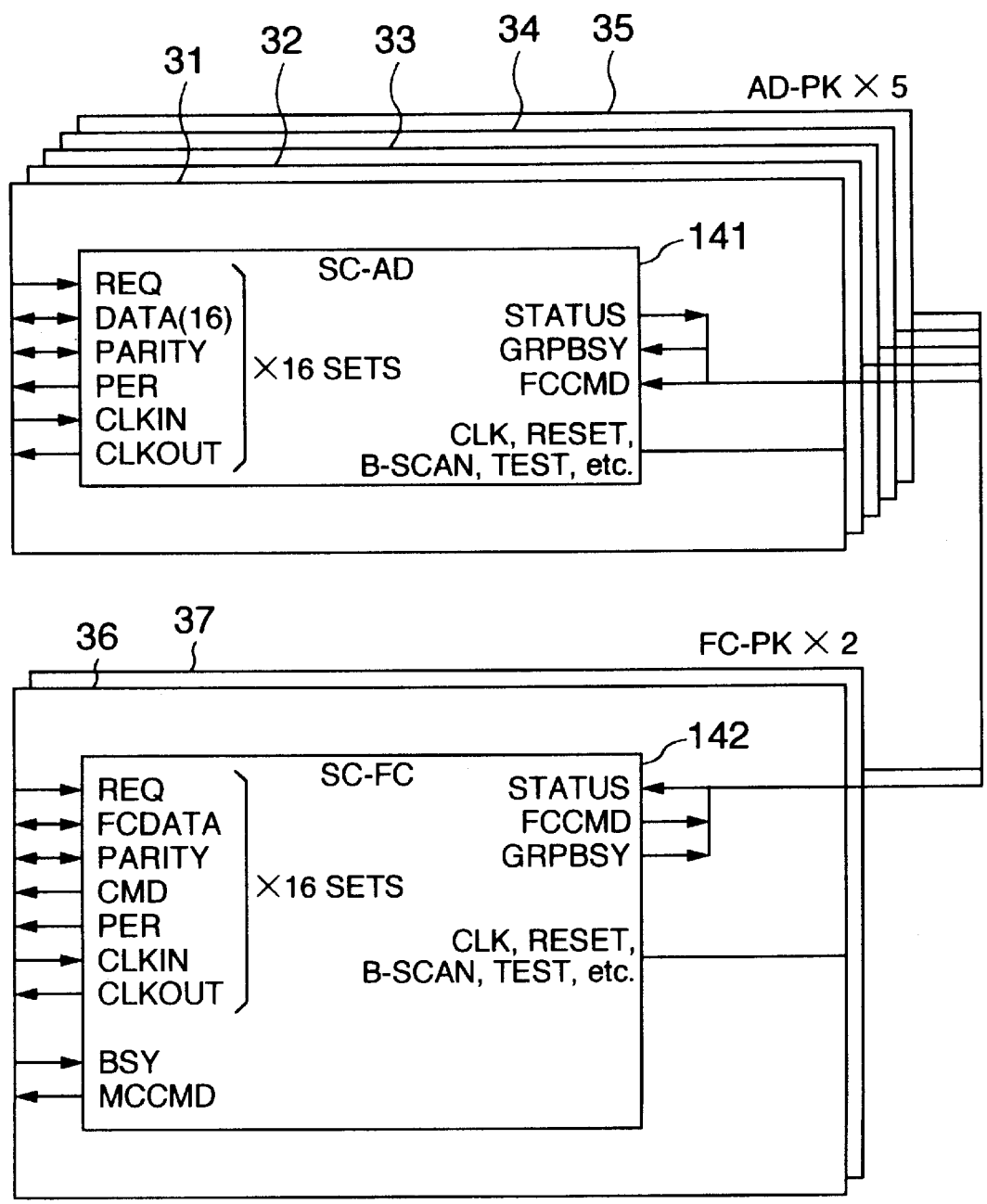
FIG. 6 is a constructional diagram of LSI input/output signals of the crossbar switch according to the invention.
Figure 7:
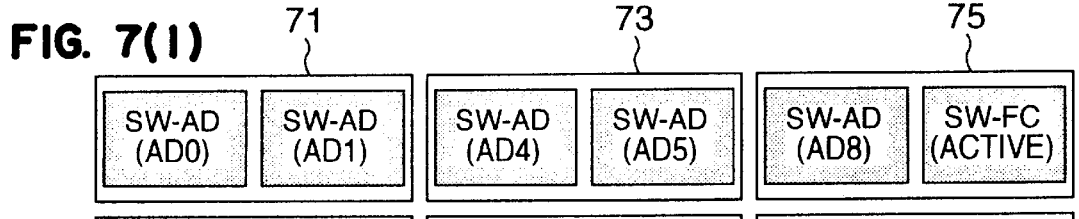
FIG. 7 is another LSI constructional diagram of the crossbar switch according to the invention.
Figure 7:
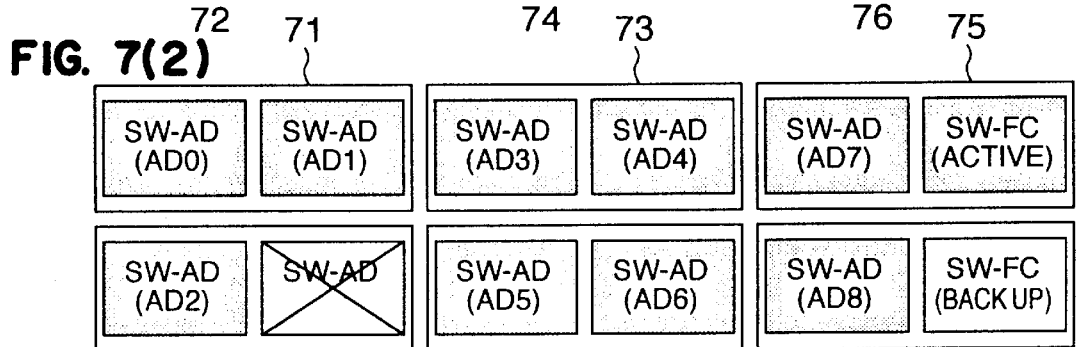
Figure 7:
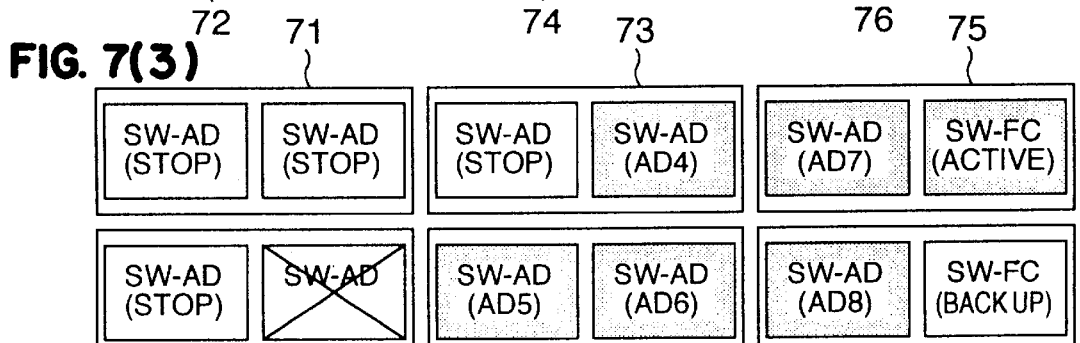
Figure 7:
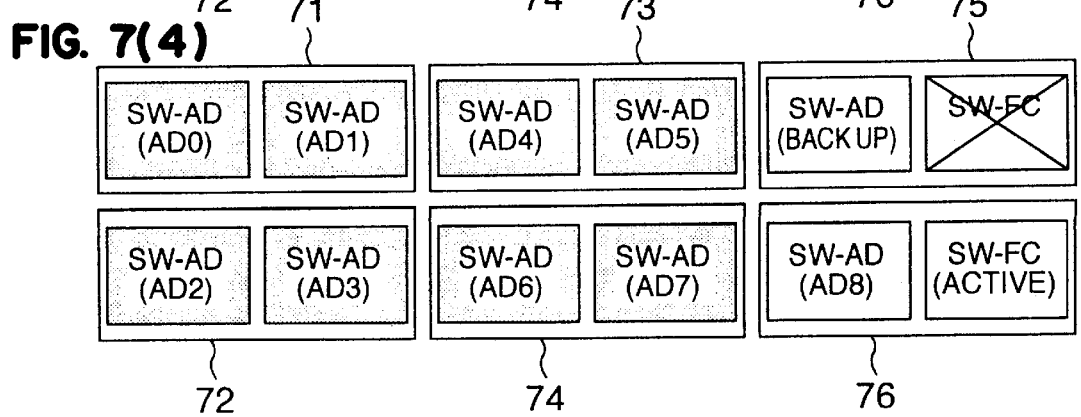
Figure 8:
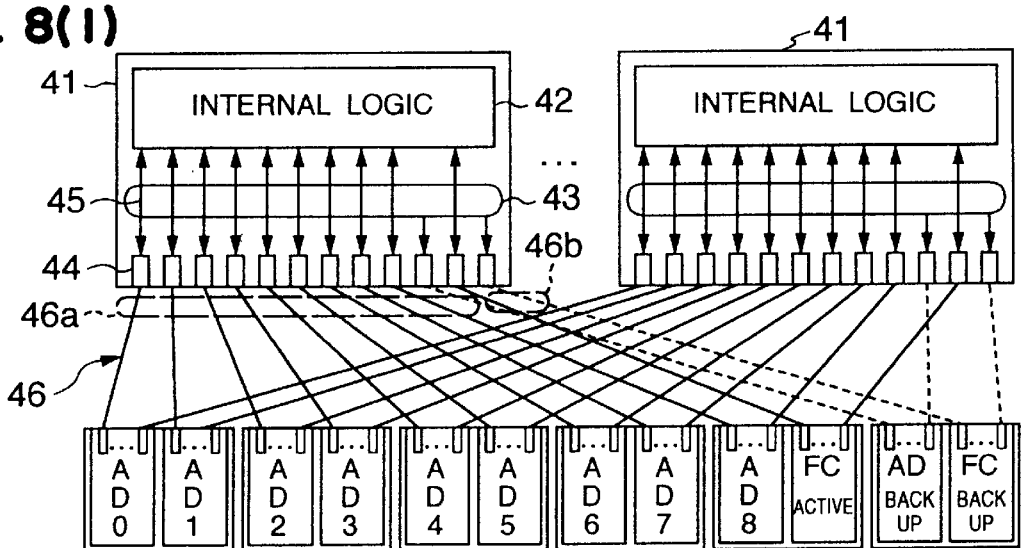
FIG. 8 is a constructional diagram of a line connection corresponding to FIG. 7 between the crossbar switch and the other system component elements in the multiprocessor system according to the invention.
Figure 8:
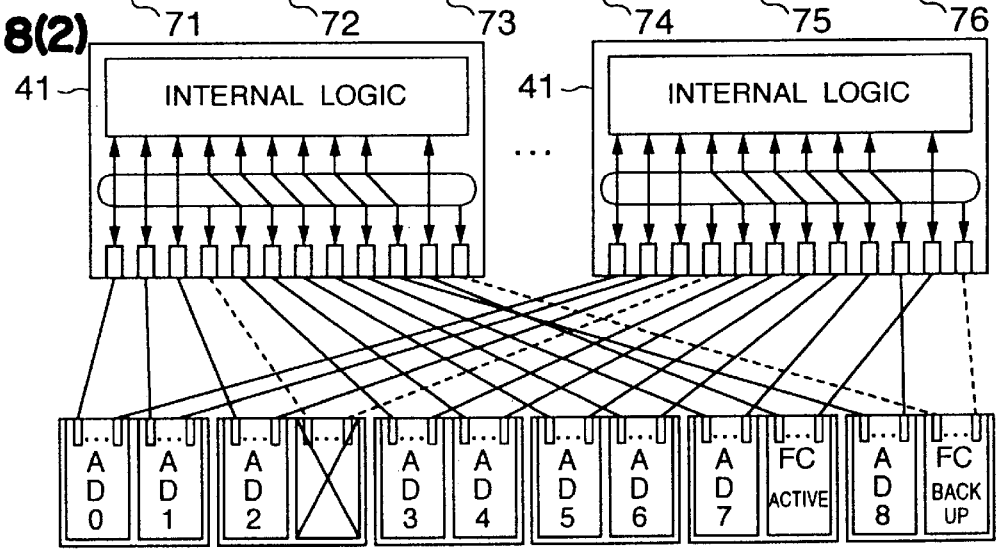
Figure 8:
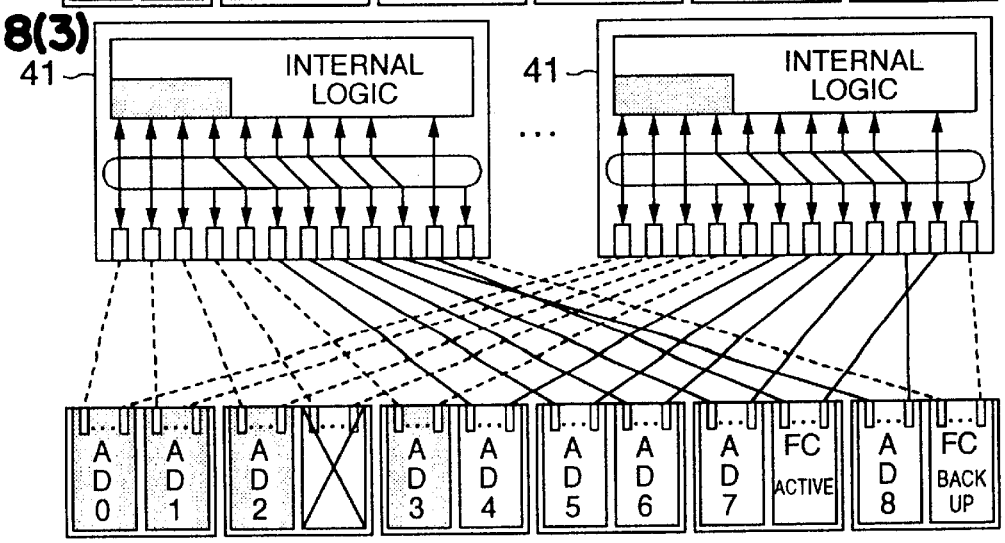
Figure 9:
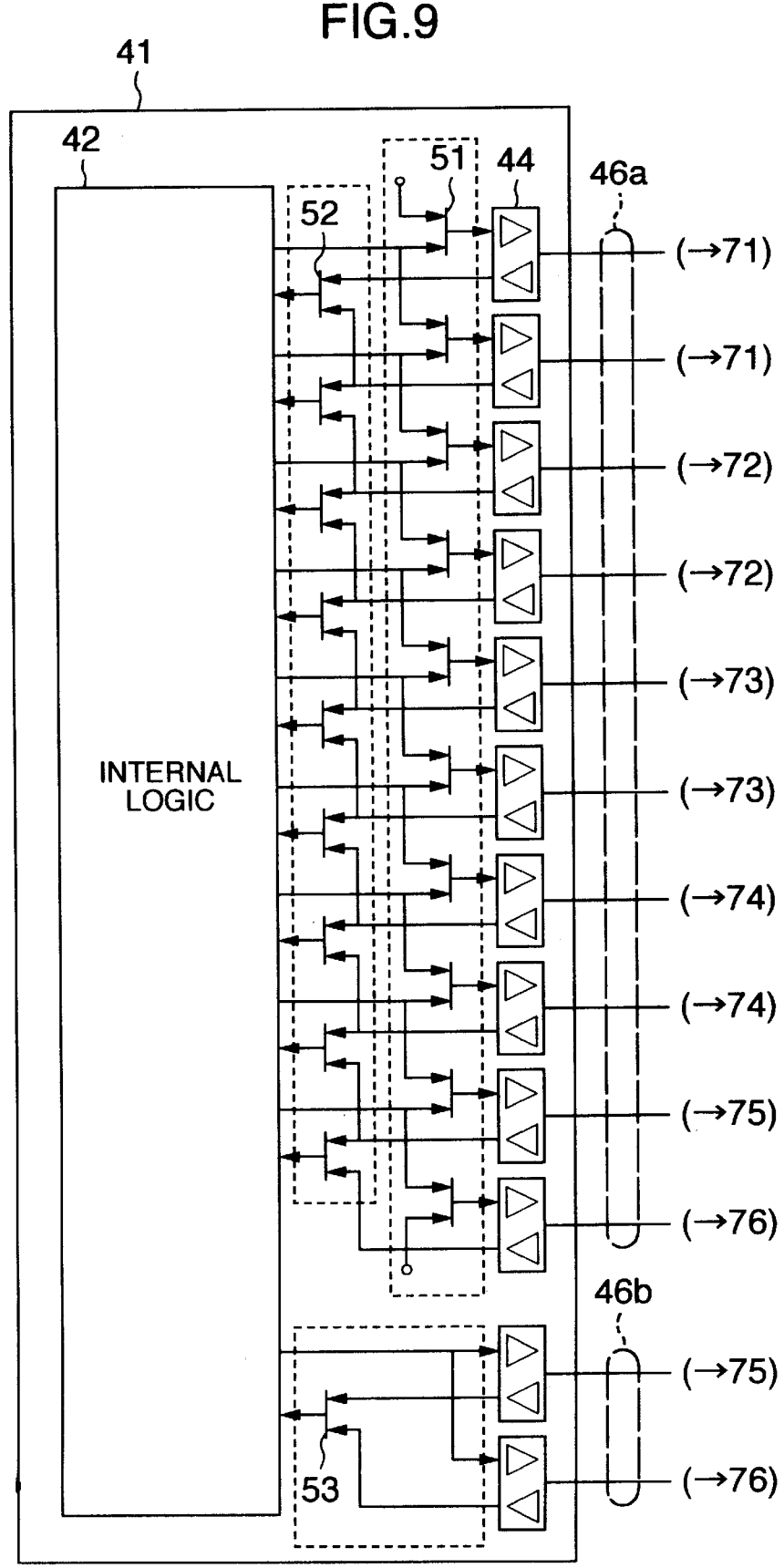
FIG. 9 is an internal constructional diagram corresponding to FIG. 7 of a connection interface to the crossbar switch from the other system component elements in the multiprocessor system according to the invention.

FIGS. 1 and 2 are constructional diagrams each showing system hardware of a multiprocessor system to which the invention is applied. FIGS. 3 and 7 are diagrams each showing an LSI construction of a crossbar switch according to the invention. FIGS. 4 and 8 are constructional diagrams each showing a line connection between the crossbar switches and the other system component elements in the multiprocessor system according to the invention. FIGS. 5 and 9 are diagrams each showing an internal construction of a connection interface to the crossbar switch from the other system component elements in the multiprocessor system according to the invention. FIG. 6 is a constructional diagram of LSI input/output signals of the crossbar switch according to the invention.

A system construction will be first described with reference to FIGS. 1 and 2.

FIG. 1 is a system hardware constructional diagram of the multiprocessor system to which the invention is applied.

In FIG. 1, reference numeral 11 denotes a plurality of processor boards; 12 a plurality of memory boards; 13 a plurality of I/O connection boards; and 14 a crossbar switch.

In FIG. 1, eight processor boards, four memory boards, and four I/O connection boards are connected to the crossbar switch of 16 ports, thereby constructing the multiprocessor system.

A plurality of CPUs 111 are installed on the processor board 11. A switch connection LSI 112 controls the plurality of CPUs 111 and a common cache memory 113 and is connected to the crossbar switch 14 through a connection interface 114.

In FIG. 1, although the CPUs 111 and switch connection LSI 112 are connected by a plurality of CPU buses 115, they can be also connected by one bus or switch. As for the common cache memory 113, a system which is not described in the embodiment and a system of only a cache tag or the like is also considered.

A main memory 121 is installed on the memory board 12. A switch connection LSI 122 controls the main memory 121 via a driver 123 and is connected to the crossbar switch 14 through a connection interface 124.

A plurality of I/O connection interfaces 131 are installed on the I/O connection board 13. An I/O switch connection LSI 132 controls the I/O connection interfaces 131 via a driver 133 and is connected to the crossbar switch 14 through a connection interface 134.

In FIG. 1, the crossbar switch 14 has an address data transfer path of an 8-byte width and another transfer path for transmitting a function control signal as connection interfaces with respect to each of the sixteen ports. The 16 ports are divided into eight ports for the processor boards 11, four ports for the I/O connection boards 13, and four ports for the memory boards 12.

The address data transfer path having the 8-byte width is divided into slices (2-byte) on a 2-byte (16 bits) unit basis and is connected by five switching LSIs 141 by a 5-slice construction in which one back-up slice is added.

A function control signal is connected by function control LSIs 142. The function control LSIs 142 have been duplicated and are made up of two LSIs.

Although the crossbar switch 14 is made up of total seven LSIs, the active LSIs which operate in the normal state among them are seven LSIs comprising four switching LSIs 141 and one function control LSI 142. Two LSIs comprising one switching LSI 141 and one function control LSI 142 are back-up LSIs.

Although ten LSIs are necessary to duplicate the whole crossbar switch 14, the crossbar switch is made up of five LSIs in the form of the invention, so that costs are reduced. A width of address data transfer path and the contents of the transfer path of the function control signal can be also made different in dependence on each of the three kinds of connection interfaces 114, 124, and 134.

FIG. 2 is another system hardware constructional diagram of a multiprocessor system to which the invention is applied.

In FIG. 2, reference numeral 21 denotes a plurality of processor memory boards and 14 indicates the crossbar switch.

In FIG. 2, sixteen processor memory boards 21 are connected to the crossbar switch 14 of 16 ports, thereby constructing the multiprocessor system. The processor memory boards 21 have a construction similar to the ordinary multiprocessor.

A plurality of CPUs 211, a multiprocessor control chip set 216, a main memory 217, and an I/O connection interface 218 are installed on the processor memory board 21 and have a construction similar to the ordinary multiprocessor.

Further, a switch connection LSI 212 controls the plurality of CPUs 211 and a common cache memory 213 and is connected to the crossbar switch 14 via a connection interface 214. In FIG. 2, the crossbar switch 14 has substantially the same construction as FIG. 1.

The constructions of FIGS. 1 and 2 are similar to the well-known system constructions except the crossbar switch 14 and the connection interface 214 to the crossbar switch 14.

The construction and operation of the crossbar switch 14 according to the invention will now be described with reference to FIGS. 3 to 6.

FIG. 3 is an LSI constructional diagram of the crossbar switch 14 in FIG. 1.

As mentioned above, the crossbar switch 14 is made up of seven LSIs comprising five switching LSIs 141 and two function control LSIs 142. In FIG. 3, seven LSIs are installed on each of the seven package boards and their parts exchanges can be performed one by one.

In FIG. 3, explanation will now be made by allocating reference numerals to the five switching LSIs 141 and two function control LSIs 142, respectively.

A construction shown at (1) is a construction in the normal operating mode. Among five switching LSIs 31 to 35, four switching LSIs 31 to 34 take charge of every two bytes of the address data transfer path of eight bytes, respectively, and the switching LSI 35 is a back-up LSI. The function control LSIs 142 have been duplicated, a function control LSI 36 is an active LSI, and a function control LSI 37 is a back-up LSI.

Among the above LSIs, a construction in the case where one of the switching LSIs 31 to 34 fails is shown at (2) and a construction in the case where one function control LSI 36 fails is shown at (3).

The construction shown at (2) is a construction in the case where the switching LSI 33 fails. The switching LSI 34 takes charge of the function of the switching LSI 33 and the back-up switching LSI 35 takes charge of the function of the switching LSI 34, thereby reconstructing the data transfer path so as not to use the failed LSI. With respect to the dividing order of the data transfer path in this instance, the data transfer path is reconstructed by a method of excluding the failed LSI and sequentially shifting the dividing order.

The construction shown at (3) is a construction in the case where the function control LSI 36 fails and the function control LSI 37 serving as a back-up LSI in the duplicated configuration is switched to the active LSI.

According to the invention as mentioned above, even if one arbitrary LSI of the crossbar switch 14 fails, the operation can be continued or restarted without deteriorating the performance as a crossbar switch 14.

Figure 4A:
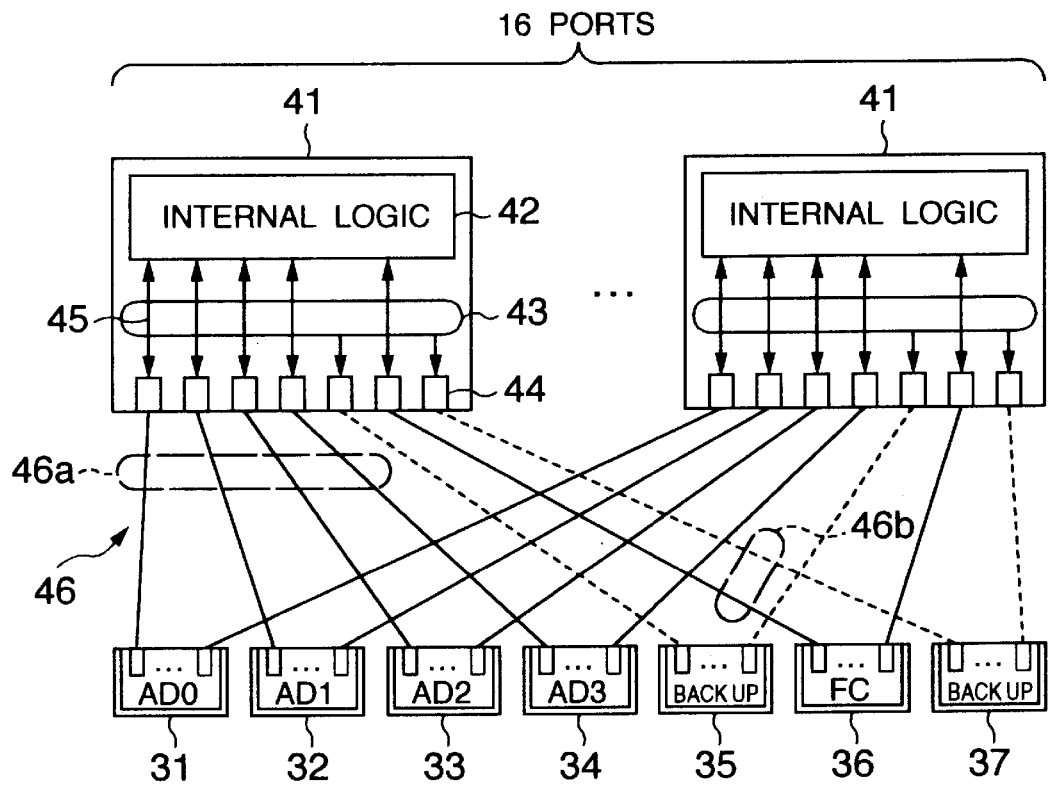
FIGS. 4A and 4B are constructional diagrams of a line connection between the crossbar switch and the other system component elements in the multiprocessor system according to the invention.
Figure 4B:
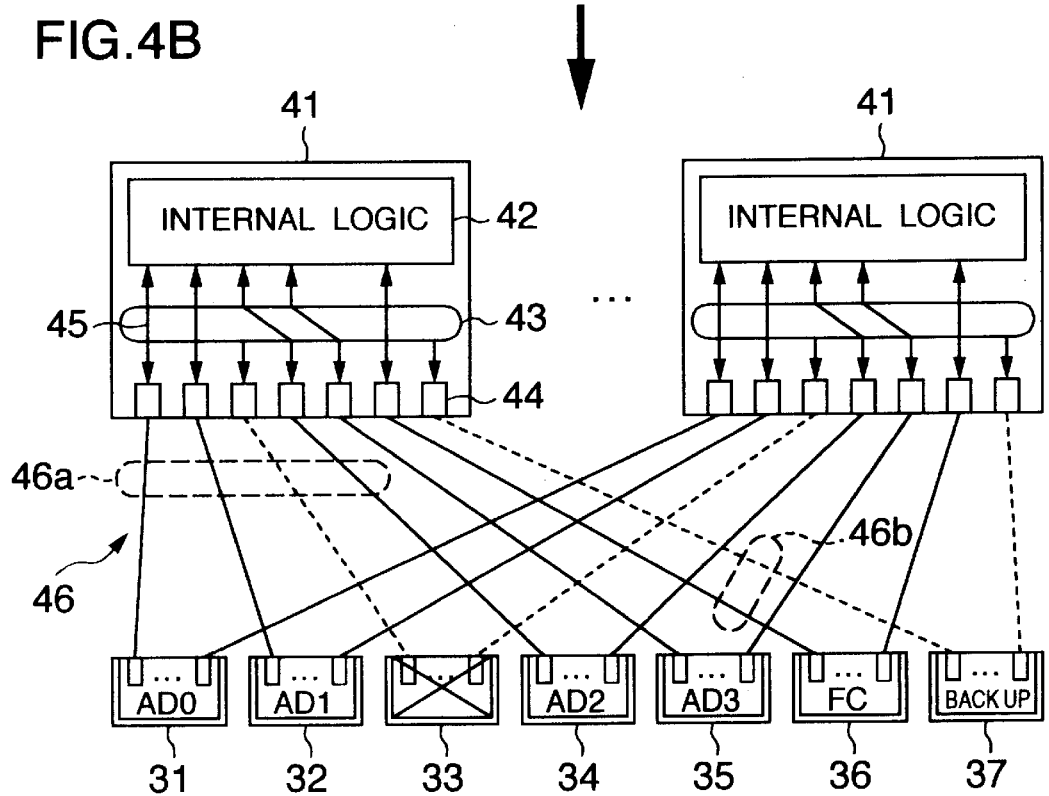

FIGS. 4A and 4B show line connection constructions between the crossbar switch 14 and the switch connection LSIs 112, 122, and 132 in order to enable the above reconstruction. In FIGS. 4A and 4B, since the switch connection LSIs 112, 122, and 132 which have already been described in FIG. 1 and the switch connection LSI 212 described in FIG. 2 have the common construction, those transfer path connection LSIs are represented by reference numeral 41.

Reference numeral 42 denotes an internal logic circuit in the transfer path connection LSI 41; 44 an input/output interface circuit in the transfer path connection LSI 41; 45 internal connection paths between the internal logic circuit 42 and input/output interface circuit 44; 43 a selecting circuit; 46 connection lines between the transfer path connection LSI 41 and crossbar switch 14; and 31 to 37 the seven switching LSIs of the crossbar switch 14 shown in FIG. 3.

FIG. 4A shows the connection in the normal operating mode.

Although the transfer path connection LSI 41 has the input/output interface circuit 44 and connection lines 46 which are connected to all of the seven switching LSIs 31 to 37 of the crossbar switch 14, the internal logic circuit 42 has only address data transfer lines 46a of an 8-byte width (2 bytes×4) and one set of function control signal transfer paths 46b and a well-known logic can be applied with respect to the internal logic circuit 42.

In FIG. 4A, the selecting circuit 43 connects the internal connection paths 45 to the switching LSIs 31 to 34 and switching LSI 36 among the seven switching LSIs 31 to 37 of the crossbar switch 14 and realizes a connection corresponding to the construction shown at (1) in FIG. 3. In this case, among the connection lines 46, the lines shown by solid lines enable the signal transmission and the lines shown by broken lines are the back-up lines.

The construction shown in FIG. 4B shows a reconstruction in the case where the switching LSI 33 fails.

In this case, in the transfer path connection LSI 41, the internal logic circuit 42 monitors the operation in an interlocking relation with the switching LSIs 31 to 37. When the internal logic circuit 42 detects a failure, the selecting circuit 43 changes the internal connection between the internal logic circuit 42 and the I/O interface circuit 44 and connects the internal connection paths 45 to the switching LSIs 31 and 32 and switching LSIs 34 to 36 among the seven switching LSIs 31 to 37 of the crossbar switch 14, thereby realizing the connection corresponding to the construction shown at (2) in FIG. 3. In this case as well, among the connection lines 46, the lines shown by solid lines enable the signal transmission and the lines shown by broken lines are the back-up lines.

Thus, the switching LSI 33 can be eliminated from the connection. Since the switching LSIs 31 to 37 of the crossbar switch 14 are individually installed on the package boards, a parts exchange of the switching LSI 33 can be performed by exchanging the package board.

Since the function control LSIs 36 and 37 have been duplicated, when the active LSI fails, the connection is switched to the back-up LSI and the parts exchange can be performed in a manner similar to the well-known duplicated system.

Figure 5A:
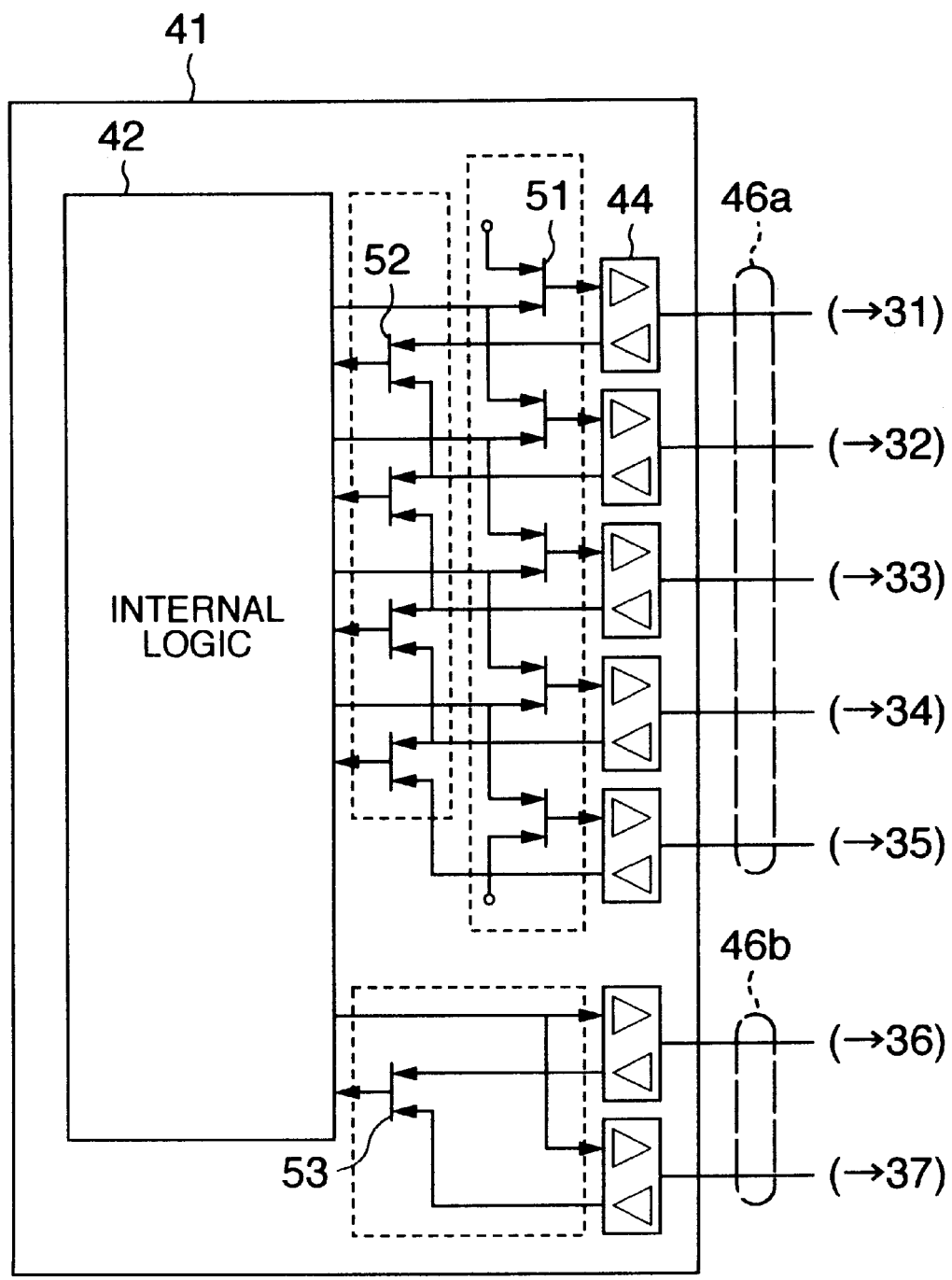
FIGS. 5A, 5B, and 5C are internal constructional diagrams of transfer path connection LSIs to the crossbar switch from the other system component elements in the multiprocessor system according to the invention.

FIG. 5A shows a detailed construction of the transfer path connection LSI 41.

In FIG. 5A, the construction of the internal logic circuit 42, I/O interface circuit 44, and connection lines 46 is substantially the same as FIG. 4. The selecting circuit 43 is made up of 2-to-1 selectors 51 to 53.

The 2-to-1 selector 51 selects the signal lines which are outputted from the internal logic circuit 42 to the I/O interface circuit 44 with respect to the address data transfer paths 46a. Selection targets are a signal line to be connected in the normal state (lower side on the drawing, namely, a signal line on the lower side between two signal lines shown by arrows to the 2-to-1 selector 51 in FIG. 5A) and a signal line to be connected by eliminating the failed switching LSI in the reconstruction at the time of the occurrence of the failure and by sequentially shifting the dividing order (upper side on the drawing, namely, an upper signal line between the two signal lines shown by the arrows to the 2-to-1 selector 51 in FIG. 5A).

In the normal operating mode, in case of outputting, all of the 2-to-1 selectors 51 select the signal lines on the lower side in the input signal lines, so that the connection corresponding to FIG. 4A can be realized.

When the internal logic circuit 42 detects that the switching LSI 33 fails as shown in FIG. 4B, the 2-to-1 selector 51 selects the signal lines on the lower side in the connection to the switching LSIs 31 and 32 and selects the signal lines on the upper side in the connection to the switching LSIs 33 to 35, respectively. Thus, the connection corresponding to FIG. 4B can be realized.

In case of inputting, with respect to the address data transfer paths 46a, the 2-to-1 selector 52 selects the signal lines which are inputted from the I/O interface circuit 44 to the internal logic circuit 42. Selection targets and a selecting method are substantially the same as those of the foregoing 2-to-1 selector 51 and the outputs and the inputs certainly correspond to one another.

A blank circle added to each of the input lines with the arrows to the 2-to-1 selectors denotes that the input line is not used.

Figure 5B:
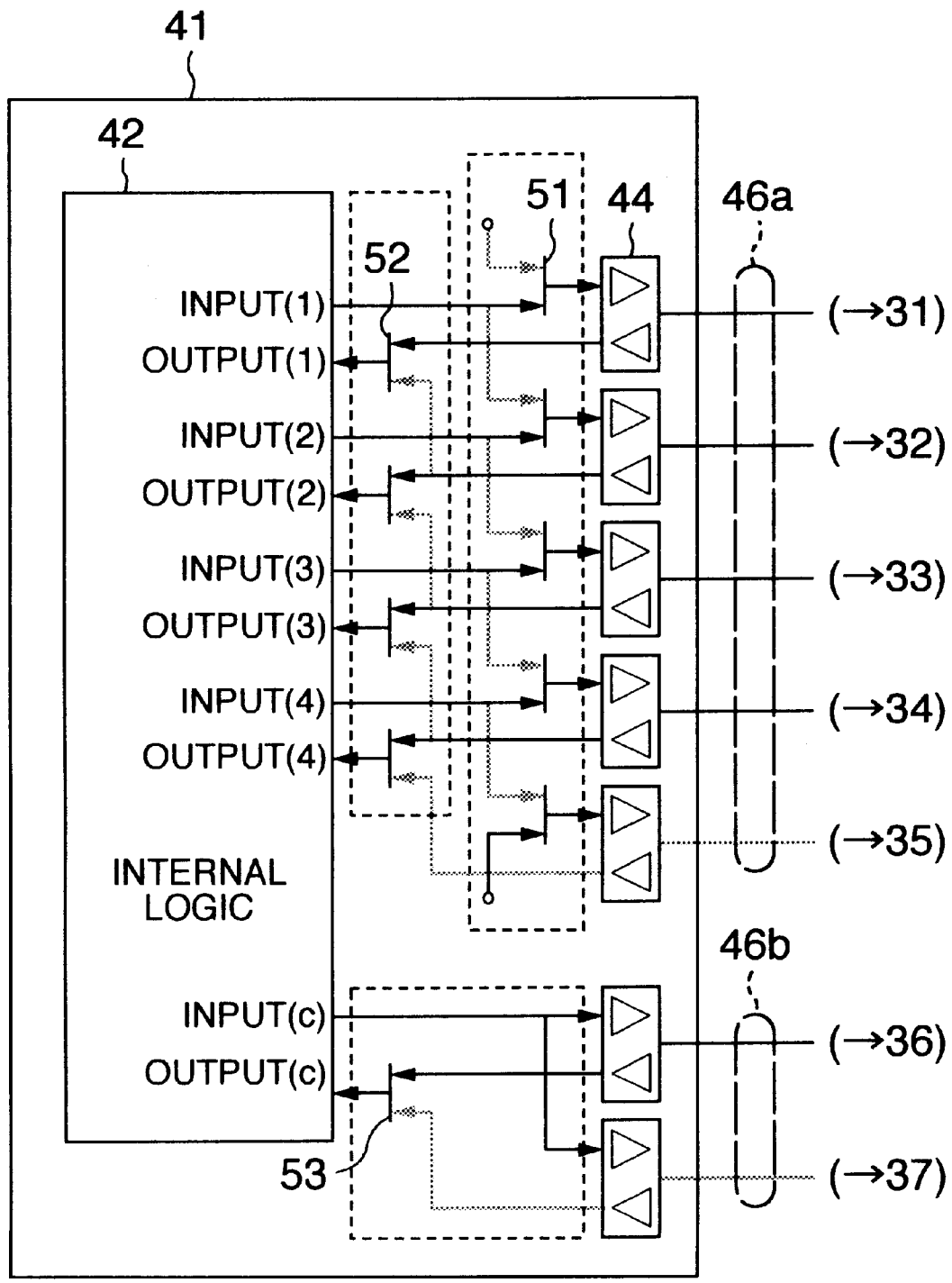
Figure 5C:
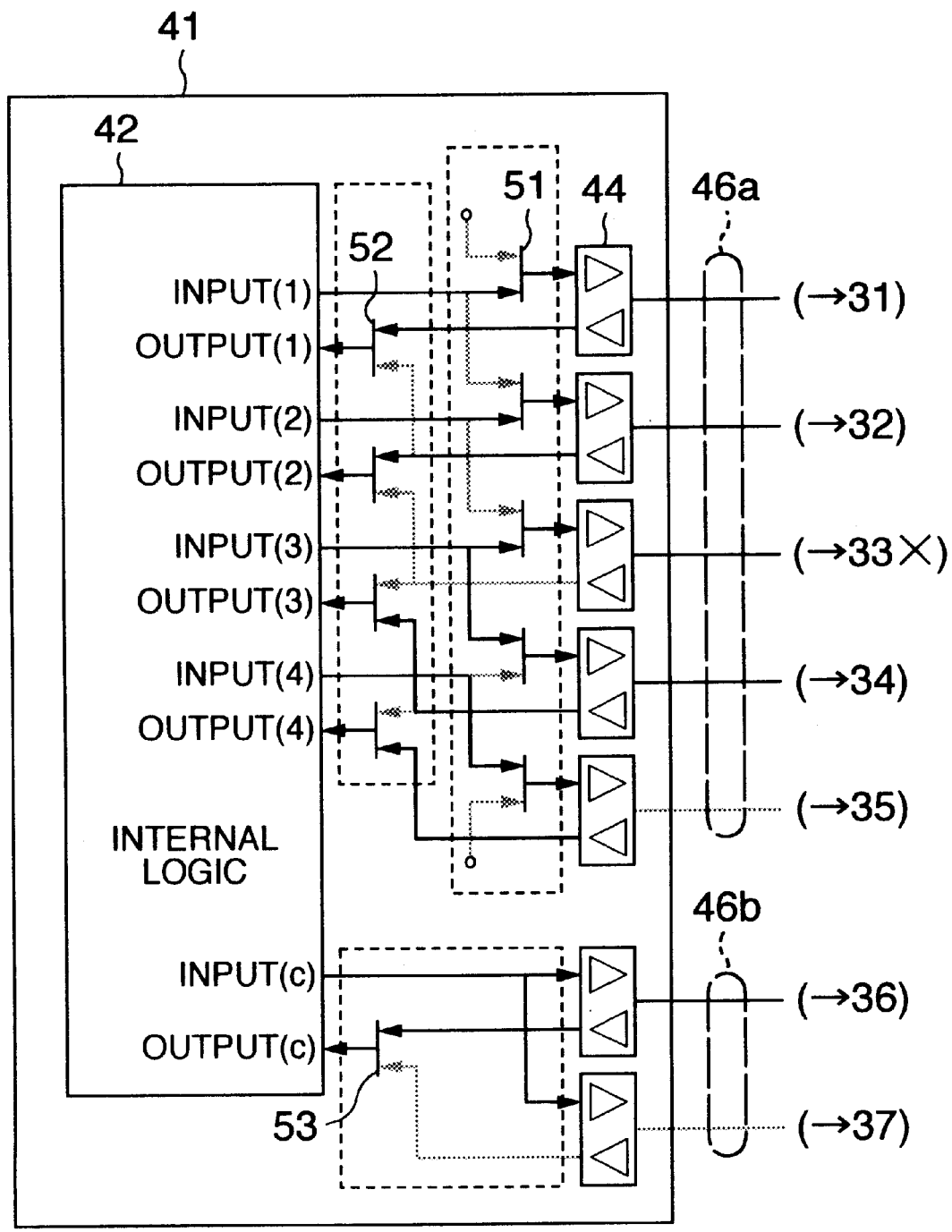

Further, the operation of the transfer path connection LSI 41 will now be described in detail with reference to FIGS. 5B and 5C. FIG. 5B shows states of the 2-to-1 selectors 51, 52, and 53 in the normal operating mode. FIG. 5C shows states of the 2-to-1 selectors 51, 52, and 53 when the switching LSI 33 fails. An explanation of the function control signal transfer paths 46b have been duplicated as mentioned above, its description is omitted and the address data transfer paths 46a will be explained.

In the normal operating mode shown in FIG. 5B, the switching LSIs 31 to 34 in the crossbar switch 14 are used for transmission and reception of data and the switching LSI 35 is used as a back-up LSI. In this example, all of the 2-to-1 selectors 51 select the inputs on the lower side shown by solid lines on the drawing. All of the 2-to-1 selectors 52 select the inputs on the upper side shown by solid lines on the drawing. As mentioned above, outputs (1) to (4) from the internal logic circuit 42 and inputs (1) to (4) to the internal logic circuit 42 are connected to the switching LSIs 31 to 34 in the crossbar switch 14 via the address data transfer paths 46a, thereby enabling the data to be transmitted and received.

In the example shown in FIG. 5C, since the switching LiSI 33 is failed, the switching LSIs 31, 32, 34, and 35 can transmit and receive data through the address data transfer paths 46a. In this example, the 2-to-1 selector 51 selects the inputs on the lower side for the switching LSIs 31 and 32 as shown by solid lines on the drawing. The inputs on the upper side of the 2-to-1 selector 51 are selected for the switching LSIs 34 and 35. With respect to the 2-to-1 selector 52, as shown by the solid lines on the drawing, the inputs on the upper side are selected as for the inputs (1) and (2) to the internal logic circuit 42 and the inputs on the lower side are selected as for the inputs (3) and (4) to the internal logic circuit 42. As mentioned above, the outputs (1) to (4) from the internal logic circuit 42 and the inputs (1) to (4) to the internal logic circuit 42 are connected to the switching LSIs 31, 32, 34, and 35 of the crossbar switch 14, so that the transmission and reception of data can be performed. That is, the outputs (3) and (4) and inputs (3) and (4) of the internal logic 42 are changed from the connecting relation shown in FIG. 5B to a connecting relation in which they are shifted one by one so as to be connected to the crossbar switching LSIs 34 and 35 and the back-up switching circuit 35 is used.

As for the output to the switching LSI 35 from the transfer path connection LSI 41 shown in FIG. 5B and the output to the switching LSI 33 shown in FIG. 5C, since there is no influence on the data transmission, any ones of the inputs on the upper side and the input on the lower side of the 2-to-1 selectors 51 and 52 corresponding to those outputs can be selected.

It will be understood from the above description that with respect to the address data transfer paths 46a, in the reconstruction when a failure occurs, so long as the method in which the switching LSIs are connected by eliminating the failed switching LSI and by sequentially shifting the dividing order is used, the selecting circuit 43 can be easily constructed by the 2-to-1 selectors. On the other hand, as another method, for example, a method of connecting only the failed switching LSI to the back-up LSI and performing a reconstruction without changing the connection of the other switching LSIs is considered. However, with this method, means for selecting any one of many-to-1 selectors is necessary to realize the selecting circuit 43 and a circuit construction becomes more complicated.

With respect to the function control signal, the 2-to-1 selector 53 selects the function control signal transfer paths 46b which are inputted from the I/O interface circuit 44 to the internal logic 42. Since the function control LSIs 36 and 37 have been duplicated, the active side is selected. A well-known duplication control circuit can be applied for the purpose of the duplication.

An example of a control method of the selecting circuit 43 having the 2-to-1 selectors 51 to 53 in FIG. 5A will now be described hereinbelow with reference to FIGS. 10 and 11.

Figure 10:
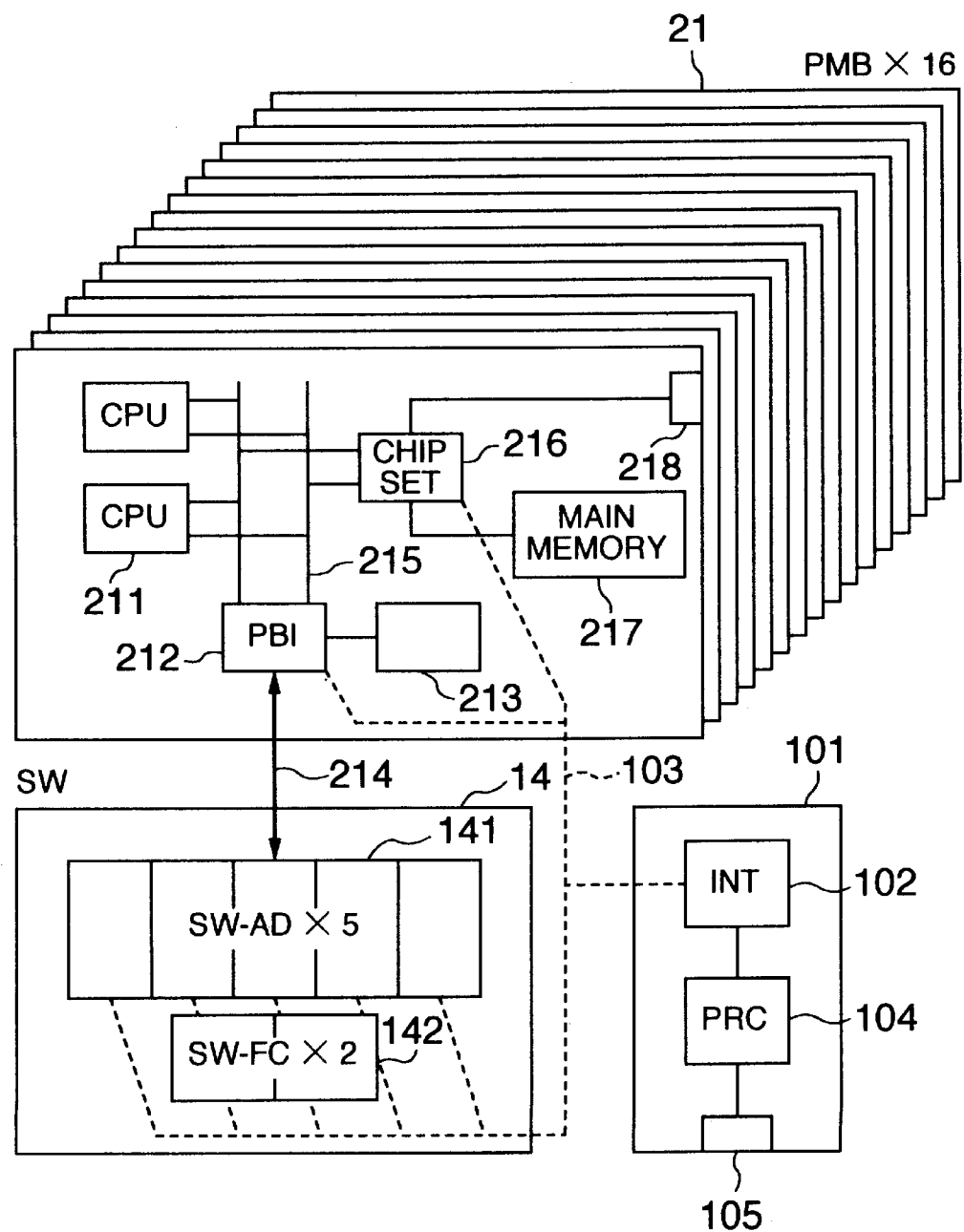
FIG. 10 is a diagram showing a construction in which a service processor board is added to the system of FIG. 2.

FIG. 10 is a diagram in which a service processor board 101 is added to the system of FIG. 2.

In FIG. 10, reference numeral 101 denotes the service processor board; 102 a bus interface logic circuit for controlling; 103 a bus for controlling; 104 a service processor; and 105 a monitor port.

A method of adding the service processor board to the system such as a server or the like is generally performed in the present products. For example, a serial bus IEEE 1394 is used as a controlling bus 103, a commercially available microcontroller is used as a service processor 104, and an RS232C interface or the like is used as a monitor port 105. In the invention as well, those well-known techniques can be used.

In FIG. 10, the controlling bus 103 is connected to each of the LSIs such as switch connection LSI 212, chip set 216, switching LSI 141, function control LSIs 142, and the like. The service processor 104 receives a notification of error information from the transfer path connection LSI 41 shown in FIG. 4 via the controlling bus 103 and can collect state information corresponding to the notification and generate a control command.

Thus, when any one of the switching LSIs 141 constructing the crossbar switch 14 fails, the service processor 104 detects it by receiving error information and, as a corresponding control command, can instruct the switch connection LSI such as a switch connection LSI 212 or the like so as to control the selecting circuit 43 having the 2-to-1 selectors 51 to 53. The construction shown in FIG. 1 will be further embodied when explaining by adding the service processor board 101 shown in FIG. 10 to the crossbar switch 14 shown in FIG. 1.

A construction on the transfer path connection LSI 41 side will now be described with reference to FIG. 11.

Figure 11:
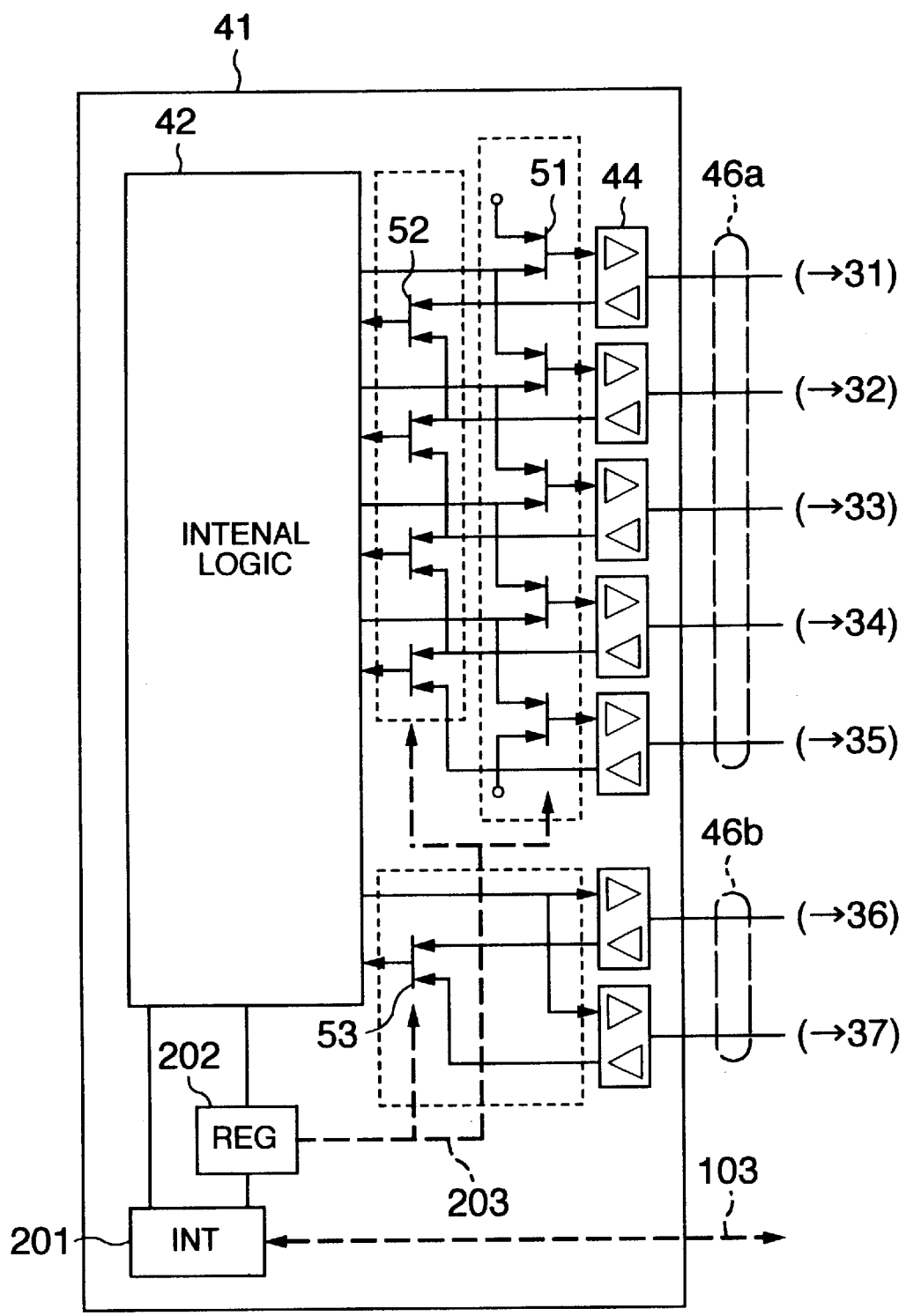
FIG. 11 is a diagram showing a construction to which a logic to connect the service processor board is added to a switch connection LSI in FIG. 5.

FIG. 11 is a diagram in which a logic to connect the service processor board 101 is added to the transfer path connection LSI 41 in FIG. 5A.

In FIG. 11, reference numeral 103 denotes the controlling bus connected to the service processor board 101 as shown in FIG. 10; 201 a bus interface logic circuit for controlling; and 202 a register for controlling the selecting circuit.

In FIG. 11, the transfer path connection LSI 41 notifies error information and state information to the service processor 104 via the controlling bus 103 and can receive a control command corresponding to those information. The construction shown in FIG. 5 will be further embodied if the controlling bus interface logic circuit 201, selecting circuit controlling register 202, a signal line 203, and controlling bus 103 shown in FIG. 11 are added to the construction shown in FIG. 5.

In the embodiment, values of selection signals of the 2-to-1 selectors 51 to 53 are individually set in accordance with set values in the selecting circuit controlling register 202.

The transfer path connection LSI 41 can change the setting of the selecting circuit controlling register 202 by an instruction from the service processor 104. Thus, when any one of the switching LSIs 31 to 37 constructing the crossbar switch 14 fails, the 2-to-1 selectors 51 to 53 can be controlled in accordance with an instruction of the service processor 104.

Specifically speaking, for instance, when one of the switching LSIs 31 to 37 fails, the service processor 104 receives an error notification from the controlling bus 103 and detects a failure. In response to the failure detection, the service processor 104 first instructs to interrupt the operation of each of the switching LSIs 31 to 34 and 36 including the transfer path connection LSI 41 via the controlling bus 103, collects state information, and determines the occurrence of a failure of, for instance, the switching LSI 33. The service processor instructs each of the switching LSIs 31 to 34 and 36 including the transfer path connection LSI 41 so as to change the setting of the 2-to-1 selectors to a construction in which the switching LSI 33 is not used, and to restart the operation of each of the switching LSIs 31, 32, 34, 35, and 36 including the transfer path connection LSI 41 after that.

By connecting an external monitor to the monitor port, the error information can be displayed to the external monitor. A parts exchange or the like can be executed in accordance with the display contents.

FIG. 6 shows a construction of input and output signals of the switching LSIs 31 to 37 of the crossbar switch 14.

In FIG. 6, the switching LSIs 31 to 37 are similar to those in FIG. 3. That is, the switching LSIs 31 to 35 are included in the switching LSIs 141 and the switching LSIs 36 and 37 are included in the function control LSIs 142.

Each of the switching LSIs 31 to 37 has general LSI control signal interfaces such as clock for controlling (CLK), reset (RESET), boundary scan (B-SCAN), signal for testing (TEST), and the like.

With respect to the sixteen ports of the switching LSIs 141, signals of a transfer request (REQ), a slice (DATA) 46a of the address data transfer paths of two bytes (16 bits), a parity (PARITY) regarding the slices 46a, a parity error notification (PER), an input of a transfer clock (CLKIN), and an output of the transfer clock (CLKOUT) from the respective ports are connected. There are sixteen sets of those signals.

In the embodiment, as for the data and parity, a clock input and a clock output are provided on the assumption of a source synchronous transfer by a bi-directional transfer path. However, the kinds of those signals depend on a protocol of the crossbar switch 14. Each set of those signals is shown at 46 in FIG. 4.

As interfaces with the function control LSIs 142, signals of a function control command (FCCMD), a status report (STATUS) for the FCCMD, and a transfer suspending instruction (GRPBSY) due to a busy state are connected to the switching LSIs 141. The kinds of those signals depend on the protocol of the crossbar switch 14.

As for the sixteen ports of the function control LSIs 142, signals of a transfer request (REQ), data for a function control (FCDATA), a parity (PARITY) regarding the FCDATA, a command for a function control (CMD), a parity error notification (PER), an input of the transfer clock (CLKIN), and an output of the transfer clock (CLKOUT) are connected. There are sixteen sets of those signals.

In the embodiment, as for the data and parity, a clock input and a clock output are provided on the assumption of a source synchronous transfer by a bi-directional transfer path. However, the kinds of those signals depend on the protocol of the crossbar switch 14. Each set of those signals is shown at 46 in FIG. 4.

The function control LSIs 142 have the interface signals with the switching LSIs 141 mentioned above and, further, have a transfer suspending request (BSY) due to a busy state and a machine checking command (MCCMD) as interface signals with the ports having a specified function. Although the kinds of those signals depend on the protocol of the crossbar switch 14, all of them have been duplicated.

Another construction and operation of the crossbar switch 14 according to the invention will now be described with reference to FIGS. 7 to 9.

FIG. 7 is an LSI constructional diagram of the crossbar switch whose scale is larger than that of the crossbar switch 14 in FIG. 1.

The crossbar switch 14 of the embodiment is made up of total twelve LSIs of ten switching LSIs and two function control LSIs. Switching LSIs (or package boards) 71 to 76 included in the switching LSIs 141 take charge of the address data transfer paths 46a of a total 18-byte width of (16 bytes+2 bytes) on a 2-byte slice unit basis.

However, the address data transfer paths 46a have a function to operate by reducing the portion of 16 bytes to only either upper 8 bytes or lower 8 bytes.

The switching LSIs 141 and function control LSIs 142 are LSIs having functions similar to those in case of the crossbar switch 14.

In FIG. 7, twelve switching LSIs 71 to 76 are installed every two LSIs on six package boards and can be parts exchanged every two LSIs.

In FIG. 7, a construction shown at (1) is a construction in the normal operation. Among the ten switching LSIs (SW-AD), nine switching LSIs take charge of the address data transfer paths 46a of 18 bytes every two bytes and one switching LSI are back-up LSIs. Function control LSIs (SW-FC) on package boards 75 and 76 have been duplicated. One function control LSI is an active LSI and another function control LSI is a back-up LSI.

Among those switching LSIs (ADφ to AD8), a construction in the case where one of the LSIs on package boards 71 to 74 fails is shown at (2). A construction in case of performing the parts exchange in the state of the construction of (2) is shown at (3). A construction in the case where one of the LSIs on the package boards 75 and 76 fails is shown at (4).

A construction shown at (2) is a construction in the case where the switching LSI shown by AD3 on the package board 72 in the construction shown at (1) fails. The switching LSIs are reconstructed by a method of eliminating the failed switching LSI and sequentially shifting the dividing order.

A construction shown at (3) is a construction in case of performing the parts exchange in the state of the construction shown at (2). The portion of 16 bytes of the address data transfer paths 46a is reduced to only lower eight bytes and is made operative, thereby enabling the package board 72 to be parts exchanged.

In case of a failure of an LSI on the package board 73 or 74, the portion of 16 bytes of the address data transfer paths 46a is reduced to only upper eight bytes and is made operative, thereby enabling the package board 73 or 74 to be parts exchanged.

A construction shown at (4) is a construction when the function control LSI (SW-FC) on the package board 75 fails. The function control LSI (SW-FC) on the package board 76 serving as a back-up LSI in the duplication is switched to the active LSI.

In this case, the switching LSI (SW-AD) on the package board 75 is also simultaneously switched to the switching LSI (SW-AD) on the package board 76, thereby enabling the package board 75 to be parts exchanged. Even if the switching LSI (SW-AD) on the package board 75 fails as well, since the function control LSI (SW-FC) is simultaneously switched, thereby enabling the package board 75 to be parts exchanged.

According to the invention as mentioned above, even if one arbitrary LSI in the crossbar switch 14 fails, the operation can be continued or restarted, thereby enabling the parts exchange to be performed by using the reducing function. A well-known logic can be applied to realize the reducing function.

FIG. 8 shows a line connection construction between the crossbar switch 14 and the switch connection LSIs 112, 122, 132, and 212 in order to enable the foregoing reconstruction.

In FIG. 8, the transfer path connection LSI 41, internal logic circuit 42, I/O interface circuit 44, internal connection paths 45 between the internal logic circuit 42 and I/O interface circuit 44, and selecting circuit 43 are similar to those in FIG. 4.

Reference numeral 46 denotes the connection lines between the switch connection LSI 41 and crossbar switch 14. Reference numerals 71 to 76 denote the six package boards.

A construction shown at (1) in FIG. 8 indicates the connection in the normal operation.

The transfer path connection LSI 41 has the I/O interface circuit 44 and connection lines 46 to connect to all of the 12 LSIs of the crossbar switch 14. However, the internal logic circuit 42 has only the address data transfer lines 46a of a 18-byte width (2 bytes×9) and one set of function control signal transfer paths 46b. A well-known logic can be applied with regard to the internal logic circuit 42.

In a construction of (1) shown in FIG. 8, the selecting circuit 43 connects the internal connection paths 45 to ten LSIs on the package boards 71 to 75 among the 12 LSIs of the crossbar switch 14, thereby realizing a connection corresponding to the construction of (1) shown in FIG. 7. In this case, among the connection lines 46, the lines shown by solid lines operate and the lines shown by broken lines are back-up lines.

A construction of (2) shown in FIG. 8 shows a reconstruction in case of the construction of (2) shown in FIG. 7.

In this case, in the transfer path connection LSI 41, the selecting circuit 43 changes the internal connection between the internal logic circuit 42 and the I/O interface circuit 44 and connects the internal connection paths 45 by a method of eliminating the failed LSI and sequentially shifting them, thereby realizing a connection corresponding to the construction of (2) shown in FIG. 7. In this case as well, among the connection lines 46, the lines shown by solid lines operate and the lines shown by broken lines are back-up lines.

A construction of (3) shown in FIG. 8 shows a state corresponding to the construction of (3) shown in FIG. 7.

Since the portion of 16 bytes of the address data transfer paths 46a are reduced to only lower eight bytes and is made operative, the operation of a meshed portion in the diagram is stopped. Among the connection lines 46, the lines shown by solid lines operate and the lines shown by broken lines are back-up lines. Thus, the parts exchange of the package board 72 can be performed.

Since the package boards 75 and 76 have actually been duplicated, in the case where the active LSI fails, the connection is switched to the back-up LSI and the parts exchange can be performed in a manner similar to the well-known duplicated system.

FIG. 9 shows a detailed construction of the selecting circuit 43 and internal connection paths 45 in FIG. 8.

In FIG. 9, the internal logic circuit 42, I/O interface circuit 44, and connection lines 46 between the transfer path connection LSI 41 and crossbar switch 14 are similar to those in FIG. 8.

The selecting circuit 43 is made up of the 2-to-1 selectors 51 to 53 and are substantially the same as those in FIG. 5. However, when the LSI on the package board 75 or 76 fails, the connections of the two LSIs of the switching LSI (SW-AD) and function control LSI (SW-FC) are simultaneously switched and they operate so as to reconstruct.

According to the invention as mentioned above, in the construction using the crossbar switch, a data transfer system in which the reliability is improved to a one point failure tolerate level can be constructed.

What is claimed is:

1. A data transfer method performed by an information processing apparatus including a plurality of units having at least a CPU, a memory, an input/output port, a plurality of input/output ports connected to the plurality of units, the input/output ports having at least one address data transfer path of an n-bit width, and a crossbar switch constructed by a plurality of LSIs (Large Scale Integrated circuit) to transfer data between the units through crossbar switch, said method comprises the steps of:

(a) dividing the address transfer path into slices of m-bit units;

(b) connecting said m-bit slices to each of said plurality of LSIs, respectively; and (c) adding redundant ones of said slices to said address transfer path, wherein, when a fault occurs in an arbitrary one of the plurality of LSIs, said method further comprises the steps of:

(d) switching the connections to non-connections between said m-bit slices connected to said fault LSI and said unit, and (e) reconstructing the address transfer path by using said m-bit slices adjacently connected to the non-fault LSIs and the redundant slice such that the fault LSI is not used.

2. A data transfer method according to claim 1 further comprising the steps of:

(f) continuing or restarting operation of the crossbar switch.

3. A data transfer method according to claim 2 wherein said step (e) is a step (g) of selecting the address data transfer path with a slice unit based on fault information of the LSIs.

4. A data transfer method according to claim 3 wherein the step (g) includes the following sub-steps of:

stopping a selection of a slice transfer path connected to the fault LSI;

selecting a slice transfer path adjacent to the slice transfer path in place of the stopped slice transfer path for the selection; and selecting a slice transfer path with the slice transfer path displaced in turn one to another.

* * * * *